(12) United States Patent
Einfalt et al.

(10) Patent No.: US 10,661,490 B2
(45) Date of Patent: May 26, 2020

(54) PROTECTIVE COVER FOR A PLASTICIZING CYLINDER

(71) Applicant: ENGEL AUSTRIA GmbH, Schwertberg (AT)

(72) Inventors: Richard Einfalt, Bad Zell (AT); Friedrich Johann Kilian, Neuhofen/Krems (DE); Florian Porod, St. Valentin (AT); Guenter Schott, St. Valentin (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 384 days.

(21) Appl. No.: 15/484,435

(22) Filed: Apr. 11, 2017

(65) Prior Publication Data
US 2017/0291341 A1 Oct. 12, 2017

(30) Foreign Application Priority Data
Apr. 12, 2016 (AT) .............................. A 50313/2016

(51) Int. Cl.
*B29C 45/17* (2006.01)
*B29C 45/74* (2006.01)
*B29C 45/62* (2006.01)
*B29C 45/78* (2006.01)
*B29C 45/76* (2006.01)

(52) U.S. Cl.
CPC ........ *B29C 45/176* (2013.01); *B29C 45/1774* (2013.01); *B29C 45/74* (2013.01); *B29C 45/62* (2013.01); *B29C 45/78* (2013.01); *B29C 2045/1784* (2013.01); *B29C 2045/1797* (2013.01); *B29C 2045/7606* (2013.01); *B29C 2945/7604* (2013.01); *B29C 2945/76531* (2013.01); *B29C 2945/76668* (2013.01)

(58) Field of Classification Search
None
See application file for complete search history.

(56) References Cited

U.S. PATENT DOCUMENTS

| 62 | A | * | 10/1836 | Whiting | .................... | F24B 5/06 |
| | | | | | | 126/1 AE |
| 3,750,134 | A | * | 7/1973 | Weisend | ................. | B29C 45/76 |
| | | | | | | 345/618 |

(Continued)

FOREIGN PATENT DOCUMENTS

| CN | 201020843 | 2/2008 |
| DE | 3742403 | 5/1989 |

(Continued)

*Primary Examiner* — Seyed Masoud Malekzadeh
*Assistant Examiner* — Manley L Cummins, IV
(74) *Attorney, Agent, or Firm* — Wenderoth, Lind & Ponack, L.L.P.

(57) ABSTRACT

A protective cover for a plasticizing cylinder of a shaping machine has an elongate internal space which is enclosed by at least one wall and in which the plasticizing cylinder can be arranged. A terminal box for heating strips arranged on the plasticizing cylinder projects into the elongate internal space, and the at least one wall has an opening which is closed by an openable cover member. In an opened condition of the openable cover member, the opening allows access to the terminal box or the interior of the terminal box.

19 Claims, 6 Drawing Sheets

(56) References Cited

U.S. PATENT DOCUMENTS

| | | | | |
|---|---|---|---|---|
| 4,421,469 A | * | 12/1983 | Egger | B29C 45/1756 |
| | | | | 425/183 |
| 4,680,002 A | | 7/1987 | Hehl | |
| 4,708,622 A | | 11/1987 | Hehl | |
| 4,730,937 A | | 3/1988 | Hehl | |
| 4,773,842 A | * | 9/1988 | Aoki | B29C 45/03 |
| | | | | 425/190 |
| 4,863,362 A | | 9/1989 | Hehl | |
| 4,886,439 A | * | 12/1989 | Hehl | B29C 45/17 |
| | | | | 425/190 |
| 4,995,801 A | * | 2/1991 | Hehl | B29C 45/1769 |
| | | | | 425/151 |
| 5,523,640 A | * | 6/1996 | Sparer | B29C 35/007 |
| | | | | 165/104.33 |
| 6,655,947 B1 | | 12/2003 | Hehl | |
| 7,393,199 B2 | * | 7/2008 | Hahn | B29C 45/16 |
| | | | | 264/328.8 |
| 2001/0024196 A1 | * | 9/2001 | Nishizawa | G05B 19/409 |
| | | | | 345/173 |
| 2012/0175815 A1 | * | 7/2012 | Aebi | B08B 15/02 |
| | | | | 264/328.1 |
| 2013/0287885 A1 | * | 10/2013 | Schad | B29C 45/1761 |
| | | | | 425/556 |
| 2015/0158226 A1 | * | 6/2015 | Imamura | B29C 45/74 |
| | | | | 425/550 |

FOREIGN PATENT DOCUMENTS

| | | | | |
|---|---|---|---|---|
| DE | 199 49 958 | | 4/2001 | |
| DE | 20 2006 012 268 | | 3/2007 | |
| EP | 0 198 410 | | 10/1986 | |
| EP | 0349807 A2 | * | 1/1990 | B29C 45/1774 |
| JP | 2010-83090 | | 4/2010 | |
| WO | WO-2011162097 A1 | * | 12/2011 | B29C 45/74 |
| WO | WO-2012159207 A1 | * | 11/2012 | B29C 45/17 |

* cited by examiner

PROTECTIVE COVER FOR A PLASTICIZING CYLINDER

BACKGROUND OF THE INVENTION

The present invention concerns a protective cover for a plasticizing cylinder of a shaping machine, a plasticizing unit having such a protective cover and a shaping machine having such a plasticizing unit.

DE 37 42 403 C1 discloses a protective cover in which a plug bar covers the end of a protective cover in the region beneath the plasticizing cylinder.

Protective covers are known in which a terminal box is externally mounted to the protective cover.

SUMMARY OF THE INVENTION

The object of the invention is to provide a protective cover of a more compact structure, in which simple and rapid change of the plasticizing unit is possible, as well as to provide a plasticizing unit having such a protective cover and a shaping machine having such a plasticizing unit.

That object is attained by a protective cover, a plasticizing unit having such a protective cover and a shaping machine having such a plasticizing unit. Advantageous embodiments of the invention are defined in the appendant claims.

The at least one wall can be of various different configurations (in isolation or as any combination), for example:
- in the form of a single wall of curved shape, enclosing an internal space of at least about 90° to about 200°,
- in the form of two straight walls in an L-configuration,
- in the form of three straight walls in a U-configuration.

The shaping machine can be for example an injection molding machine.

The invention affords a series of advantages:
- it involves a very compact structure,
- the terminal box remains easily accessible from the exterior for service operations,
- freely hanging cables are no longer required on the entire plasticizing unit whereby handling is markedly easier when changing the plasticizing unit,
- the cabling of the heating strips to the terminal box can be of a fixed nature.

When changing the plasticizing unit therefore there is no need for separation as between the heating strips and the terminal box.
- a low number of plugs in the terminal box is achieved by the combination of a plurality of heating strip cables or heating strips on a plug.
- the integration of the terminal box provides that only one interface is necessary in respect of various screw diameters and length/diameter ratios of the plasticizing units. That permits simple and rapid change of a plasticizing unit and the same cables can be used with different plasticizing units, which permits standardization of the cable lengths.
- integration of the terminal box on the plasticizing unit makes it possible to standardize the interface between a main switch cabinet of the shaping machine and the plasticizing unit.

It is particularly preferably provided that the terminal box has a side which faces towards the plasticizing cylinder in the mounted condition and which extends in the longitudinal direction of the internal space and is of a concave configuration. In that way the terminal box can so-to-speak fit snuggly to the cylindrical contour of the plasticizing cylinder.

According to the invention there is at least one terminal box per plasticizing unit, but there can also be a plurality of terminal boxes. The arrangement is preferably implemented on a lateral wall of the protective cover or a lateral portion of the at least one wall, but an arrangement at the top side or underside of the plasticizing unit is also possible.

The ratio between the spacing of a lateral wall of the protective cover from the central axis of the plasticizing cylinder and the external radius of the plasticizing cylinder is in a range of about equal to 3 to about 1.1 (preferably from about equal to 2.5 to about 1.4) and is preferably less than or equal to 1.6.

It can also be provided that a control and/or power electronic system for the heating strips is arranged in the internal space in the protective cover, preferably in the terminal box. That permits decentral control and/or power supply for regulation of the heating strips. That decentralization affords more space in the main switch cabinet of the shaping machine.

It is quite particularly preferably provided that the openable cover member is in the form of a cover member of the terminal box, wherein preferably the cover member of the terminal box adjoins flush the wall having the opening so that the terminal box is arranged completely in the internal space except for the cover member. In this embodiment the terminal box fits into the protective cover of the plasticizing unit in the optimum fashion. As the terminal box does not protrude from the protective cover there are no pinch locations between the nozzle protection and the terminal box. As a result the means for protection from outspraying can be of a closely fitting configuration, which further enhances operator safety.

It can be provided that the interface plugs of the terminal box are so arranged that the plugging directions extend parallel to that wall of the protective cover that has the opening.

Preferably the interface plugs are adapted to be pluggable.

The integration of the terminal box on the heated plasticizing cylinder, in particular with the snugly fitting structure, can require thermal uncoupling of the terminal box from the heating strips. That can be effected in various ways (individually or in any combination):
- Reduction in the heat transfer by radiation by means of:
  - fitting beam protection plates between the terminal box and the plasticizing cylinder,
  - using beam protective films on the terminal box,
  - using insulating mats on the terminal box, and
  - insulating the plasticizing cylinder.
- Reduction in the heat transfer by conduction by using thermal insulating elements in the mechanical connection of the terminal box to the plasticizing cylinder.
- Reduction in the heat transfer by conduction by arranging a defined air gap between the plasticizing cylinder and the terminal box.
- Using a cooling device:
  - active cooling (preferably controlled) of the terminal box by water or air cooling,
  - cooling ribs arranged on the terminal box,
  - using the chimney effect occurring through a gap between the plasticizing cylinder and the terminal box (cooling action due to natural convection).

It can be provided that the plasticizing unit has a display means and/or interface for an operator, for example:
- displaying status information on a display (for example defective heating strips, currently prevailing temperatures and temperature distributions, currently prevailing switching state, remaining service life of the installed heating strips), integrated user interface on the plasticizing unit (for example the option of presetting the temperature or temperatures directly at the plasticizing unit), integrated interface on the plasticizing unit to an external user interface (for example wirelessly or wired for a mobile or stationary device).

It is preferably provided that a cable run connecting the terminal box to the heating strips is arranged above the plasticizing cylinder. If temperature-resistant cable is used the cable run can be arranged without an additional cable protection beneath the protective cover of the plasticizing cylinder. Arranging the cable run above the plasticizing cylinder affords advantages in terms of accessibility upon mounting or when replacing a defective heating strip. Alternatively the cable run can also be arranged laterally of the plasticizing cylinder or at an incline above the plasticizing cylinder.

It is preferably provided that a nozzle heating strip and associated temperature sensor are connected to the terminal box by way of a plug connection. That provides that the nozzle heating strip can be very quickly changed.

The terminal box can have at least one information interface for the connection (for example plugging connection) of a sensor or data bus.

The plug which is closest to the filling opening of the plasticizing cylinder ideally involves a defined spacing A with the same outside diameter of the plasticizing cylinder and with a given structural size of the plasticizing unit. The magnitude of the spacing A however can be freely selected.

Preferably the plugs are arranged protected so that they are not damaged when setting up the plasticizing unit by means of an adjusting leg of the plasticizing unit and a plasticizing cylinder support.

BRIEF DESCRIPTION OF THE DRAWINGS

An embodiment of the invention is described with reference to the Figures in which:

FIG. 4 shows a side view of the plasticising unit.

DETAILED DESCRIPTION OF THE INVENTION

Figure 1:
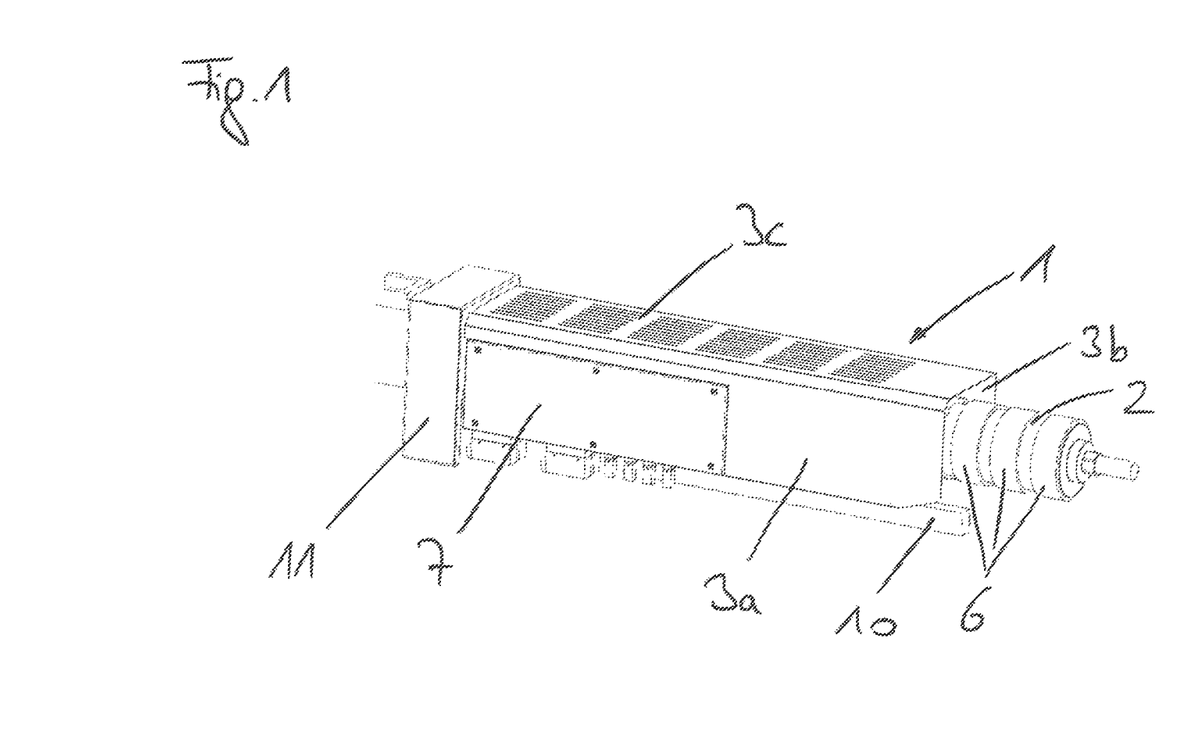
FIG. 1 shows an isometric view of a plasticising unit according to the invention.
Figure 5:
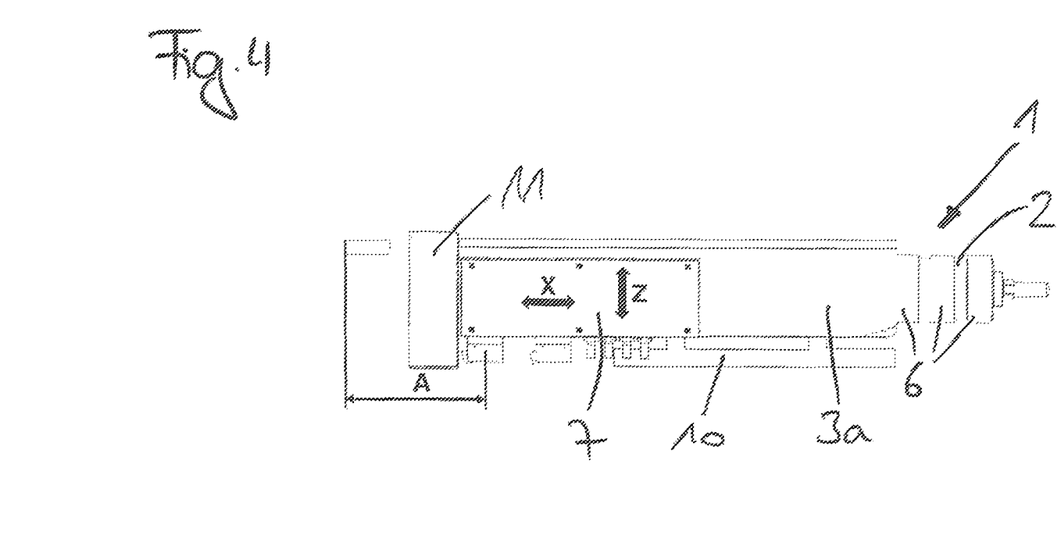
FIG. 5 shows a protective cover according to the invention with an opened cover member.

FIG. 1 shows a portion of a plasticizing unit of a shaping machine according to the invention, which otherwise corresponds to the state of the art. It is possible to see a protective cover 1 having two lateral walls 3a, 3b and an upper wall 3c in a U-shaped configuration. The protective cover 1 is open downwardly. It is possible to see the plasticizing cylinder 2 which is arranged in the internal space 4 in the protective cover 1 and on which heating strips 6 are arranged. The protective cover 1 has an opening 8 (see FIG. 5) which is closed in FIG. 1 by a cover member 7. In the illustrated embodiment the cover member 7 is in the form of a cover member of the terminal box 5 and adjoins the wall 3a of the protective cover 1 in flush relationship. After removal of the screws (here six) which can be seen the content of the terminal box 5 is accessible from the exterior without further parts of the protective cover 1 having to be dismantled. The cover member 7 can naturally be openable in any fashion. In operation the plasticizing cylinder 2 is supported on the underlying surface by way of a plasticizing cylinder support 10. After the plasticizing unit has been dismantled it can be supported preferably at least in a three-point support configuration by way of the plasticizing cylinder support 10 and a further support 11 (which has for example at least two support points).

Figure 2:
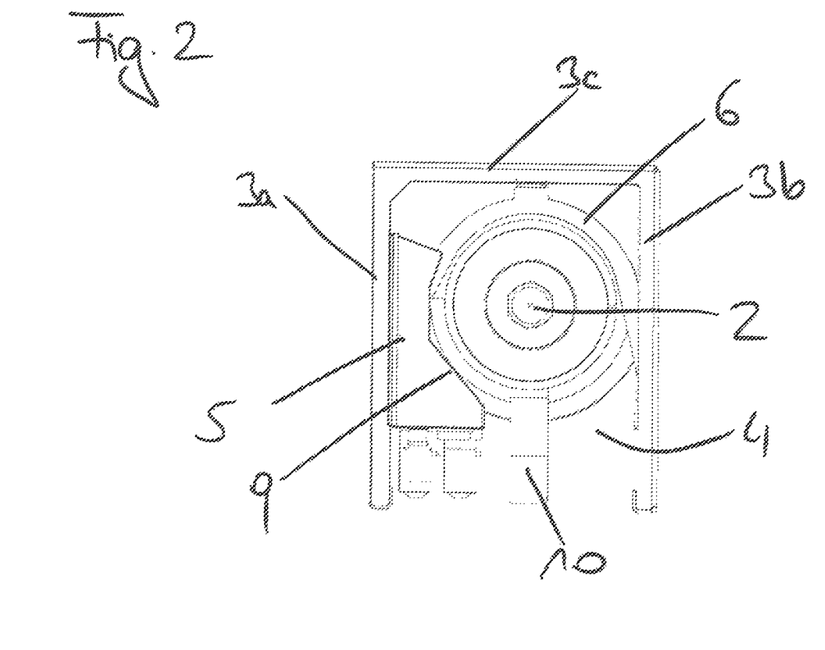
FIG. 2 shows a view of the end of the plasticising unit.
Figure 3:
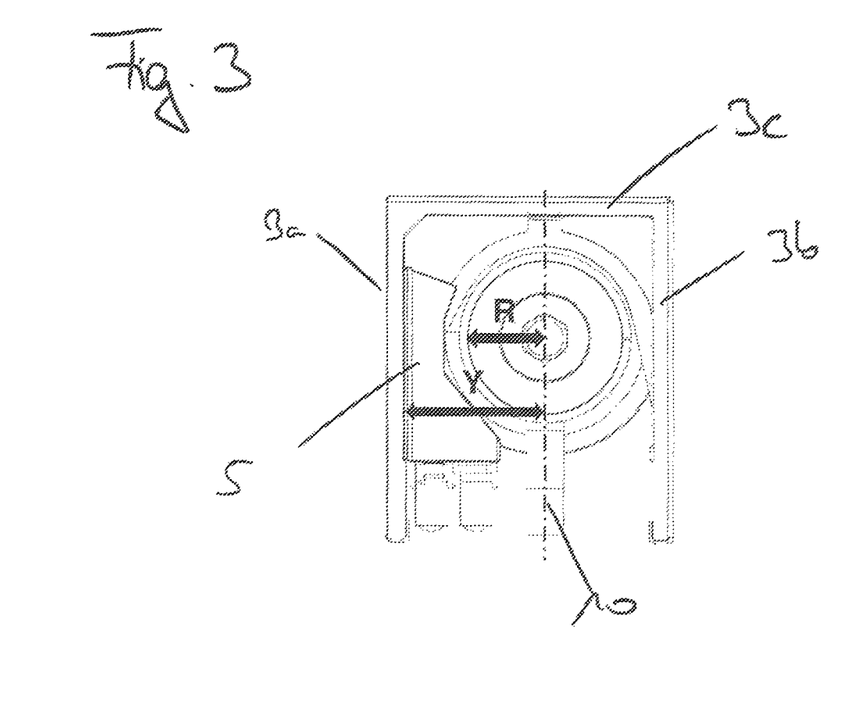
FIG. 3 shows a further view of the end of the plasticising unit.

FIG. 2 shows that in this embodiment the terminal box 5 has a side which is towards the plasticizing cylinder 2 and which extends in the longitudinal direction of the internal space 4 and is concave. The ratio between the spacing Y of a lateral wall 3a, 3b of the protective cover 1 from the central axis of the plasticizing cylinder 2 and the external radius R of the plasticizing cylinder 2 is in a range of Y/R approximately equal to 3 to about 1.1—preferably (Y/R) approximately equal to 2.5 to about 1.4—and is preferably less than or equal to 1.6 (see FIG. 3).

FIG. 4 shows a wide view of the plasticizing unit shown in the preceding Figures, with a spacing A being illustrated. This involves the spacing A between a filling opening of the plasticizing cylinder 2 and that plug which is closest to the filling opening of the plasticizing cylinder 2. Ideally, with the same outside diameter of the plasticizing cylinder 2 and a given structural size of the plasticizing unit, it involves a defined spacing A. The magnitude of the spacing A however can be freely selected.

Figures 6A, 6C:
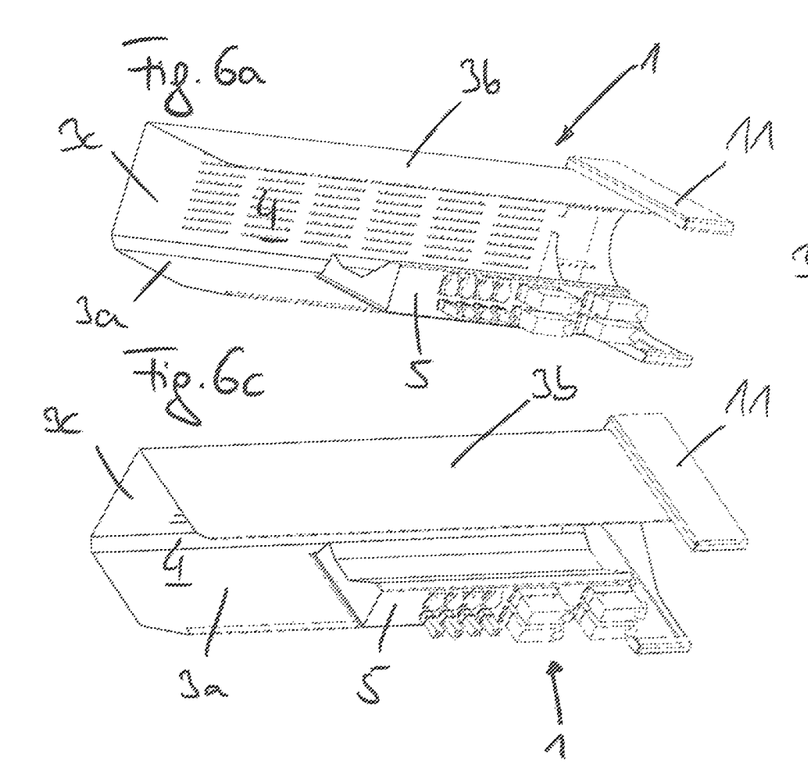
FIGS. 6a-6c show isometric views from below on to the protective cover.
Figure 6B:
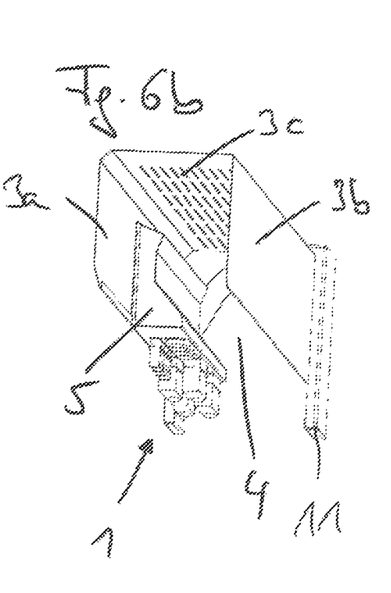

FIGS. 6a to 6c show views into the empty protective cover 1, that is to say without the plasticizing cylinder 2 arranged in the internal space, but with the terminal box 5 being shown.

LIST OF REFERENCES 1 protective cover
2 plasticizing cylinder
3a, 3b, 3c walls of the protective cover
4 internal space in the protective cover
5 terminal box
6 heating strip
7 cover member of the protective cover
8 opening in the protective cover
9 side of the terminal box that is towards the plasticizing cylinder
10 plasticizing cylinder support
11 further support

The invention claimed is:

1. A protective cover for a plasticizing cylinder of a shaping machine, the protective cover comprising:
   a plurality of walls;
   an openable cover member; and
   a terminal box for heating strips on the plasticizing cylinder,
   wherein:
   the terminal box includes electrical connections;
   the plurality of walls partially encloses an elongate internal space, the plurality of walls including two lateral walls and an upper wall between the two lateral walls;
   the elongate internal space is configured to receive the plasticizing cylinder;
   the terminal box projects into the elongate internal space; and the openable cover member is configured to:
(i) in a closed position, close an opening defined in a portion of one of the two lateral walls; and
(ii) in an open position, allow access to the terminal box through the opening defined in the portion of the one of the two lateral walls, the terminal box being directly behind the opening.

2. The protective cover according to claim 1, wherein:
the terminal box has a side which is of a concave configuration and extends in a longitudinal direction of the elongate internal space; and
the side of the terminal box is configured to face towards the plasticizing cylinder in a mounted condition of the plasticizing cylinder.

3. The protective cover according to claim 1, further comprising at least one of a controller and power electronics, wherein the at least one of the controller and power electronics is in the elongate internal space.

4. The protective cover according to claim 3, wherein the at least one of the controller and power electronics is in the terminal box.

5. The protective cover according to claim 1, wherein:
the electrical connections include interface plugs; and
the interface plugs extend parallel to the one of the two lateral walls.

6. The protective cover according to claim 1, further comprising a cooling device.

7. A plasticizing unit for a shaping machine, the plasticizing unit comprising:
a plasticizing cylinder including heating strips;
a protective cover including a plurality of walls, an openable cover member, and a terminal box for the heating strips on the plasticizing cylinder,
wherein:
the terminal box includes electrical connections;
the plurality of walls partially encloses an elongate internal space, the plurality of walls including two lateral walls and an upper wall between the two lateral walls;
the plasticizing cylinder is in the elongate internal space;
the terminal box projects into the elongate internal space; and
the openable cover member is configured to:
(i) in a closed position, close an opening defined in a portion of one of the two lateral walls; and
(ii) in an open position, allow access to the terminal box through the opening defined in the portion of the one of the two lateral walls, the terminal box being directly behind the opening.

8. The plasticizing unit according to claim 7, further comprising:
a cable,
wherein:
the cable connects the terminal box to the heating strips; and
the cable is between the protective cover and the plasticizing cylinder.

9. The plasticizing unit according to claim 7, further comprising:
a nozzle heating strip; and
a temperature sensor,
wherein:
the nozzle heating strip and the temperature sensor are connected to the terminal box by the electrical connections which include interface plugs.

10. The plasticizing unit according to claim 7, further comprising at least one information interface.

11. The plasticizing unit according to claim 7, wherein the terminal box is thermally insulated or thermally uncoupled from the heating strips and the plasticizing cylinder.

12. The plasticizing unit according to claim 7, further comprising:
a plasticizing cylinder support for the plasticizing cylinder; and
a further support.

13. The plasticizing unit according to claim 7, further comprising at least one of a display and an interface.

14. A plasticizing unit for a shaping machine, the plasticizing unit comprising:
a plasticizing cylinder including heating strips;
a protective cover including a plurality of walls, an openable cover member, and a terminal box for the heating strips on the plasticizing cylinder,
wherein:
the plurality of walls partially encloses an elongate internal space;
the plasticizing cylinder is in the elongate internal space;
the terminal box projects into the elongate internal space; and
the openable cover member is configured to:
(i) in a closed position, close an opening defined in a portion of one of the plurality of walls;
(ii) in an open position, allow access to the terminal box through the opening defined in the portion of the one of the plurality of walls; and
wherein a ratio between: (i) a spacing (Y) of the one of the plurality of walls from a central axis of the plasticizing cylinder; and (ii) an external radius of the plasticizing cylinder (R) is in a range of (Y/R) from 3 to 1.1.

15. A plasticizing unit for a shaping machine, the plasticizing unit comprising:
a plasticizing cylinder including heating strips;
a protective cover including a plurality of walls, an openable cover member, and a terminal box for the heating strips on the plasticizing cylinder,
wherein:
the plurality of walls partially encloses an elongate internal space;
the plasticizing cylinder is in the elongate internal space;
the terminal box projects into the elongate internal space; and
the openable cover member is configured to:
(i) in a closed position, close an opening defined in a portion of one of the plurality of walls;
(ii) in an open position, allow access to the terminal box through the opening defined in the portion of the one of the plurality of walls; and
wherein a ratio between: (i) a spacing (Y) of the one of the plurality of walls from a central axis of the plasticizing cylinder; and (ii) an external radius of the plasticizing cylinder (R) is in a range of (Y/R) from 2.5 to 1.4.

16. A plasticizing unit for a shaping machine, the plasticizing unit comprising:
a plasticizing cylinder including heating strips;
a protective cover including a plurality of walls, an openable cover member, and a terminal box for the heating strips on the plasticizing cylinder,
wherein:
the plurality of walls partially encloses an elongate internal space;
the plasticizing cylinder is in the elongate internal space;
the terminal box projects into the elongate internal space; and the openable cover member is configured to:
(i) in a closed position, close an opening defined in a portion of one of the plurality of walls;
(ii) in an open position, allow access to the terminal box through the opening defined in the portion of the one of the plurality of walls; and
wherein a ratio between: (i) a spacing (Y) of the one of the plurality of walls from a central axis of the plasticizing cylinder; and (ii) an external radius of the plasticizing cylinder (R) is in a range of (Y/R) less than or equal to 1.6.

17. A shaping machine comprising:
a plasticizing unit
wherein:
the plasticizing unit includes a plasticizing cylinder including heating strips and a protective cover;
the protective cover includes a plurality of walls, an openable cover member, and a terminal box for the heating strips on the plasticizing cylinder;
the terminal box includes electrical connections;
the plurality of walls partially encloses an elongate internal space, the plurality of walls including two lateral walls and an upper wall between the two lateral walls;
the plasticizing cylinder is in the elongate internal space;
the terminal box projects into the elongate internal space; and
the openable cover member is configured to:
(i) in a closed position, close an opening defined in a portion of one of the two lateral walls; and
(ii) in an open position, allow access to the terminal box through the opening defined in the portion of the one of the two lateral walls, the terminal box being directly behind the opening.

18. The shaping machine according to claim 17, wherein the shaping machine is an injection molding machine.

19. A protective cover for a plasticizing cylinder of a shaping machine, the protective cover comprising:
a plurality of walls;
an openable cover member; and
a terminal box configured to regulate heating strips on the plasticizing cylinder, wherein:
the plurality of walls partially encloses an elongate internal space, the plurality of walls including two lateral walls and an upper wall between the two lateral walls;
the elongate internal space is configured to receive the plasticizing cylinder;
the terminal box projects into the elongate internal space; and
the openable cover member is configured to:
(i) in a closed position, close an opening defined in a portion of one of the two lateral walls; and
(ii) in an open position, allow access to the terminal box through the opening defined in the portion of the one of the two lateral walls, the terminal box being directly behind the opening.

* * * * *